3,111,387
HYDROGEN RECOVERY

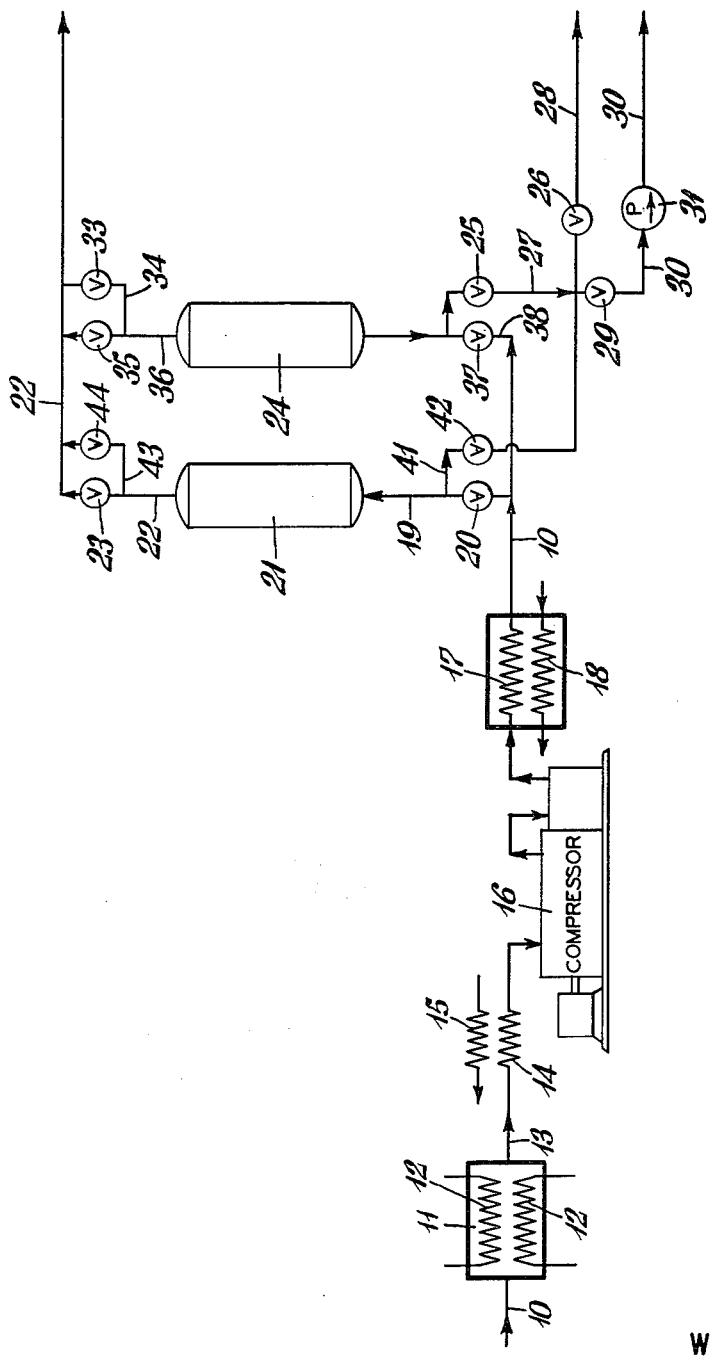

William F. Avery, Buffalo, and Robert W. Alexis, Williamsville, N.Y., assignors to Union Carbide Corporation, a corporation of New York
Filed May 26, 1960, Ser. No. 31,888
11 Claims. (Cl. 23—212)

This invention relates to an improved process for recovering substantially pure hydrogen gas from a gas mixture containing nitrogen, ammonia and moisture, and more specifically to a process for removing these constituents from a gas mixture by contact with an adsorbent material.

Ammonia is transported as a liquid and may be dissociated into its components at points of consumption, thus providing an economical means for transportation of hydrogen gas. The dissociation reaction is as follows:

$$2NH_3 \rightarrow 3H_2 + N_2 \qquad (1)$$

This reaction is the reverse of the ammonia synthesis reaction and goes essentially to completion at pressures up to 20 p.s.i.g. and a temperature of 1650–1850° F. The product gas is then approximately 75 volumes of hydrogen and 25 volumes of nitrogen.

Dissociated ammonia is an economical source of a hydrogen-rich gas for such purposes as hydrogenating fats and oils, as a protective atmosphere in the bright annealing of metals and in powder metallurgy, in the reduction of metal oxides, and in atomic hydrogen welding.

The presence of nitrogen and residual ammonia is sometimes troublesome when the dissociated gas is used. For example, in the production of rare metals such as tungsten and molybdenum, the nitrogen leads to formation of the metal nitride or an undesirable type of crystal growth is induced. The dissociated gas usually contains some water impurity also, even though anhydrous ammonia is used as a feed gas. The residual ammonia has been removed in the prior art by water-washing or adsorption on a common adsorbent such as activated alumina. Activated alumina is also effective in removing water impurity from the gas. These purifications do not, however, reduce the nitrogen content of the gas to make a product suitable for those applications where the nitrogen is deleterious in the process or to the product.

A principal object of this invention is to provide a method of removing nitrogen, ammonia and moisture from a hydrogen-containing gas.

Another object is to provide a method for simultaneously removing nitrogen, ammonia and moisture from a hydrogen-containing gas mixture in a single step operation.

Still another object of this invention is to provide a method for recovering substantially pure hydrogen gas from liquid ammonia.

Other objects and advantages of the present invention will be apparent from the ensuing disclosure and appended claims.

In the drawing, the single FIGURE shows a schematic flowsheet for continuously recovering substantially pure hydrogen gas from the aforedefined gas mixture, according to the present invention.

The aforementioned objects are accomplished by providing the gas mixture at a feed pressure above atmospheric, and cooling the compressed gas mixture to a temperature below about 60° F. A bed of crystalline zeolitic molecular sieve material is also provided having apparent pore sizes of at least 4 Angstrom units, and as an adsorption step the compressed and cooled gas mixture is contacted with the zeolitic molecular sieve bed thereby adsorbing nitrogen, ammonia and moisture.

A substantially pure hydrogen product gas is discharged from the molecular sieve bed, and the adsorption stroke is continued for a desired period, that is, the adsorption stroke is terminated before or when the nitrogen content of the product gas becomes appreciable.

The gas mixture flow to the molecular sieve bed is then terminated, and the nitrogen, ammonia and moisture-containing bed is regenerated by three consecutive steps. First, the bed is depressurized to atmospheric pressure thereby removing the gas mixture from the void spaces of the bed and simultaneously desorbing a portion of the adsorbed nitrogen. Next, the depressurized bed is evacuated to a pressure below atmospheric such that the ratio of the evacuation pressure to adsorption pressure is below about 0.2, thereby desorbing ammonia, moisture and additional nitrogen from the bed. This ratio has been found to provide sufficient impurity removal and regeneration of the molecular sieve bed so that a hydrogen product purity of at least about 80% by volume may be consistently maintained during the succeeding adsorption stroke. Finally, a sufficient portion of the hydrogen product gas is diverted to the evacuated bed to repressurize the bed to about the feed gas pressure, thereby establishing substantial equilibrium with the residual nitrogen remaining in the evacuated bed. This feature has been found advantageous since the product hydrogen recovered from the regenerated bed during the initial part of its adsorption stroke will immediately be in equilibrium with the residual nitrogen and thus provide the desired purity. After the repressurization step, the adsorption and regeneration steps are consecutively repeated.

It has been unexpectedly discovered that certain naturally occurring and synthetic crystalline zeolites of suitable pore size preferentially and simultaneously adsorb nitrogen, ammonia and moisture to the substantial exclusion of hydrogen. The pores must be sufficiently large to permit entry of the components into the inner cage of the molecular sieve. That is, the maximum critical dimension of the molecule must be no larger than the pore diameter to pass therethrough. However, the critical dimensions of the molecules under consideration are all of the same order of magnitude as follows: water—3.2 Angstroms, ammonia—3.8 Angstroms, nitrogen—3.0 Angstroms and hydrogen—2.4 Angstroms. It is also known by those skilled in the molecular sieve art that most molecular sieve separations are based on the acceptance of certain molecules due to their critical dimensions being smaller than the pores, and rejection of other molecules because of their larger critical dimensions. Thus, one would logically conclude that zeolite molecular sieves do not afford a practicable means for separating hydrogen from a gas mixture containing nitrogen, ammonia and moisture.

To the contrary, it has been found quite unexpectedly that zeolitic molecular sieve material having apparent pore sizes of at least 4 Angstroms provide an excellent means for effecting this separation to an almost quantitative degree. Very little hydrogen is coadsorbed on the sieve material with the nitrogen, ammonia and moisture. The reasons for this phenomenon are not fully understood, but it is believed that the relatively high quadruple moment of nitrogen is an important factor.

Although any synthetic or naturally occurring zeolitic molecular sieve material having an apparent pore size of at least 4 Angstroms is satisfactory for practicing this invention, pore sizes larger than about 4.5 Angstroms are preferred since they provide somewhat faster adsorption-desorption equilibrium rates and generally possess greater internal adsorption volumes.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal alumino-silicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Angstrom units whereas calcium zeolite A has an apparent pore size of about 5 Angstrom units.

Among the naturally occurring zeolitic molecular sieves suitable for use in the present invention include mordenite and chabazite both having an apparent pore size of about 4 Angstrom units, and erionite having an apparent pore size of about 5 Angstrom units. The natural materials are adequately described in the chemical art. The preferred synthetic crystalline zeolitic molecular sieves include zeolites A, D, R, T, X and Y.

Zeolite A is a crystalline zeolitic molecular sieve which may be represented by the formula:

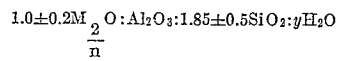

$$1.0\pm0.2M_{\frac{2}{n}}O:Al_2O_3:1.85\pm0.5SiO_2:yH_2O$$

where M represents a metal, $n$ is the valence of M, and $y$ may have any value up to about 6. The as-synthesized zeolite A contains primarily sodium ions and is designated sodium zeolite A. All of the monovalent cation forms of zeolite A have an apparent pore size of about 4 Angstroms, excepting the potassium form which has a pore size of about 3 Angstroms and consequently is unsuitable for use in the present invention. When at least about 40 percent of the monovalent cation sits are satisfied with di- or trivalent metal cations, zeolite A has an apparent pore size of about 5 Angstroms. Zeolite A is described in more detail in U.S. Patent No. 2,882,243 issued April 14, 1959, to R. M. Milton.

Zeolite D has an apparent pore size of about 4 Angstroms, and is described and claimed in U.S. patent application Serial No. 680,383 filed August 26, 1957, now abandoned.

Zeolite L has an apparent pore size of about 10 Angstroms, and is described and claimed in U.S. patent application Serial No. 711,565 filed January 28, 1958, now abandoned.

Zeolite R has an apparent pore size of about 4 Angstroms, and is described and claimed in U.S. patent application Serial No. 680,381 filed August 26, 1957, U.S. Patent 3,030,181

Zeolite T has an apparent pore size of about 5 Angstroms, and is described and claimed in U.S. patent application Serial No. 733,819 filed May 8, 1958 and issued August 30, 1960, as U.S. Patent No. 2,950,952.

Zeolite X has an apparent pore size of about 10 Angstroms, and is described and claimed in U.S. Patent No. 2,882,244 having issued April 14, 1958, to R. M. Milton.

Zeolite Y has an apparent pore size of about 10 Angstroms, and is described and claimed in U.S. patent application Serial Nos. 728,057 and 862,062 filed respectively on April 14, 1958, and December 28, 1959, both now abandoned.

Referring now more specifically to the drawing, liquid ammonia is supplied through conduit 10 at an above-atmospheric pressure and is directed to chamber 11 where it is heated to a temperature in the range of 1650–1850° F. for vaporization and dissociation in accordance with Reaction 1. The heating may be obtained as illustrated by electric coils 12 although the chamber may alternatively be fired by a suitable combustion gas in a manner well understood by those skilled in the art. The dissociation pressure is preferably below about 35 p.s.i.a. and in the presence of a catalyst such as tungsten metals or oxides to hasten the attainment of equilibrium. The hot dissociated gas emerges through conduit 13 and contains approximately 75 volumes of hydrogen and 25 volumes of nitrogen, moisture in the range of −40° to −90° F. dew point and up to about 500 p.p.m. ammonia. The hot gas is preferably partially cooled in passageway 14 by heat exchange with a suitably colder fluid such as water circulating through thermally associated passageway 15. The partially cooled dissociated gas mixture may for purposes of illustration comprise 500 c.f.h. of fluid at 25 p.s.i.g. and 100° F., having the following composition: 75 volume percent hydrogen, 25 volume percent nitrogen, −90° F. dew point moisture content and 150 p.p.m. ammonia. This gas mixture is then preferably compressed to a higher pressure between about 50 and 500 p.s.i.a. such as 200 p.s.i.a. in compressor 16, cooled in passageway 17 to a temperature below 60° F. and preferably between 30° F. and −100° F. The cooling is effected by heat exchange with a colder fluid such as difluorodichloromethane in passageway 18. The reason for the upper temperature limits is that higher values would reduce nitrogen adsorption loadings to such an extent that hydrogen product recovery would be greatly reduced if a high product purity is to be maintained. The lower temperature limit is determined by the fact that below the defined range, hydrogen is coadsorbed to the extent that it interferes with nitrogen adsorption. Also, temperatures below −100° F. are not readily attainable with commercially available refrigeration equipment.

The cooled gas mixture for example at −20° F. is directed from conduit 10 to communicating conduit 19 having control valve 20 therein, and passed to first crystalline zeolitic molecular sieve bed 21 which, for purposes of this example, constitutes 450 pounds of ⅛-inch diameter 20% clay-bonded pellets of calcium zeolite A. A substantially pure hydrogen product gas stream is discharged from the opposite end of first bed 21 into product conduit 22 having control valve 23 therein, and either passed to the point of consumption or to suitable storage means. During the adsorption stroke, the first bed temperature may rise about 60° F. due to heats of adsorption of the nitrogen, ammonia and moisture constituents. In the present example the product gas is about 99.25% hydrogen with a 91.4% recovery of the hydrogen in the original feed gas mixture.

While first zeolitic molecular sieve bed 21 is on adsorption stroke, second zeolitic molecular sieve bed 24 is on regeneration stroke, the two beds being piped in parallel flow relationship. In the present example both the adsorption and regeneration strokes require one hour, but the latter is divided into three portions, namely depressurization or blowdown, evacuation or vacuum desorption and repressurization. At the beginning of regeneration, second bed 24 is isolated and is at a pressure such as 200 p.s.i.a. and a temperature of 40° F. The bed is loaded with adsorbed nitrogen and the void spaces contain gas of feed composition. Regeneration is initiated by opening valves 25 and 26 in discharge and blowdown conduits 27 and 28 respectively. The pressure in second bed 24 is blown down to approximately one atmosphere, preferably countercurrent to the feed gas flow direction. The gas removed during this portion of the cycle is mostly void-space material but also contains some desorbed nitrogen. When the pressure within second bed 24 has dropped to approximately one atmosphere, valve 26 in blowdown conduit 28 is closed and valve 29 in evacuation conduit 30 is opened. Vacuum pump 31 in conduit 30 starts to evacuate the second bed 24 through communicating conduit 38, discharge conduit 27 and evacuation conduit 30. During this evacuation step, the nitrogen loading remaining on the bed is countercurrently desorbed along with the small amounts of water and ammonia adsorbed at the feed end of the bed during the preceding adsorption stroke. The latter constituents are purged off of the bed by the low pressure nitrogen flow occurring during the vacuum desorption. A small residual nitrogen loading remains on the bed at the end of the desorption step, and the bed temperature has dropped back down to about −20° F. due to heats of desorption.

When the pressure within the second zeolitic molecular sieve bed 24 has been reduced to a subatmospheric pressure whereby the ratio of evacuation pressure to adsorption pressure is below about 0.2 and preferably an absolute value below about 3 p.s.i.a., e.g. 1.5 p.s.i.a., valves 25 and 29 are closed. This pressure ratio and the preferred absolute evacuation pressure values have been found necessary since they affect both the hydrogen product purity and recovery. The pressure ratio determines the nitrogen contamination in the hydrogen product thus establishing the product purity. The absolute evacuation pressure determines the available nitrogen adsorption loading thus affecting the bed size required for the process and the product purity.

To repressurize the evacuated second bed 24, valve 33 is opened in bypass conduit 34 around product valve 35 in product conduit 36. This adjustment allows product hydrogen gas from first bed 21 to be diverted from conduit 22 into second bed 24 and thereby repressurize the bed to the gas mixture feed pressure, e.g. 200 p.s.i.a. Valve 33 in bypass conduit is preferably sized smaller than product valve 35 in conduit 36 so that only a portion of the hydrogen product stream is diverted from conduit 22 for the repressurization. When the second bed 24 has been repressurized, this bed is ready to be returned to the adsorption stroke of the cycle by opening feed gas inlet control valve 37 in conduit 38, and discharge valve 35 in conduit 36. The hydrogen product gas leaving the adsorbent beds during the adsorption stroke is in equilibrium with the residual nitrogen loading left by the evacuation as has previously been discussed.

The switchover of second bed 24 to the adsorption stroke and first bed 21 to the regeneration stroke can be effected at any desired point in the cycle, but is usually performed before an appreciable quantity of nitrogen is detected in the product hydrogen gas. This function is preferably accomplished in a manner well known to those skilled in the art by an automatic cycle timer (not shown) which actuates the proper valves at the proper times in a repetitious manner for each cycle. The second bed adsorption stroke is performed in a manner analogous to the first bed adsorption stroke as described, and the first bed regeneration stroke is effected similarly to the second bed regeneration stroke. That is, during the depressurization step the first bed 21 is blown down through discharge conduit 41, valve 42 therein, and communicating blowdown conduit 28. During the evacuation step nitrogen and the other absorbates are withdrawn through conduit 19, communicating discharge conduit 41 having control valve 42, and evacuation conduit 30 having vacuum pump 31 therein. Finally, during the repressurization step product hydrogen is diverted from conduit 22 through bypass conduit 43 having control valve 44 therein to first zeolitic molecular sieve bed 21.

In the present example, the time schedule for the entire cycle is as follows:

|  | Hours | Min. | Sec. |
| --- | --- | --- | --- |
| Adsorption stroke | 1 | 0 | 0 |
| Regeneration Stroke: |  |  |  |
|   Depressurization |  | 0 | 6 |
|   Evacuation |  | 50 |  |
|   Repressurization |  | 9 | 54 |
|   Total | 1 | 0 | 0 |
| Total cycle time | 2 |  |  |

Although preferred embodiments of the invention have been described in detail, it is contemplated that modifications of the process may be made and that some features may be employed without others, all within the spirit and scope of the invention. For example, any or all of the three separation streams, namely the hydrogen product gas, the blowdown stream and the evacuation desorbate may be heat exchanged with the gas mixture feed stream to reduce the refrigeration load.

As another alternative, either or both the blowdown gas and the evacuation desorbate may be recycled to the feed gas mixture to improve hydrogen product recovery, although this would result in an increased zeolitic molecular sieve bed size and increased feed compression costs. The blowdown gas is the most likely product for recycle because the evacuation desorbate does not contain appreciable hydrogen, while the blowdown gas approaches feed composition.

What is claimed is:

1. A process for recovering substantially pure hydrogen gas from a gas mixture containing hydrogen, nitrogen, ammonia and moisture, comprising the steps of providing said gas mixture at a feed pressure above atmospheric; cooling such compressed gas mixture to a temperature below about 60° F.; providing a bed of crystalline zeolitic molecular sieve material having apparent pore sizes of at least 4 Angstroms; as an adsorption stroke contacting the compressed and cooled gas mixture with the zeolitic molecular sieve bed thereby adsorbing said nitrogen, ammonia and moisture; discharging substantially pure hydrogen product gas from the molecular sieve bed; continuing the adsorption stroke for a desired period; terminating the gas mixture flow to said molecular sieve bed; depressurizing the nitrogen, ammonia, and moisture-containing bed to atmospheric pressure thereby removing the gas mixture from the void spaces of the bed and simultaneously desorbing a portion of the adsorbed nitrogen; evacuating the depressurized bed to a pressure below atmospheric such that the ratio of evacuation pressure to adsorption pressure is below about 0.2 thereby desorbing ammonia, moisture and additional nitrogen from the bed; diverting a sufficient portion of the hydrogen product gas to the evacuated bed to repressurize the bed to about said feed gas pressure, thereby establishing substantial equilibrium with the residual nitrogen remaining in the evacuated bed; and thereafter consecutively repeating said adsorption stroke and said depressurizing, evacuating and repressurizing steps.

2. A process according to claim 1 wherein the crystalline zeolitic molecular sieve material has apparent pore sizes of at least 4.5 Angstroms.

3. A process according to claim 1 wherein the gas mixture feed pressure is between about 50 and 500 p.s.i.a.

4. A process according to claim 1 wherein the compressed gas mixture is cooled to a temperature between about +30° and —100° F. prior to said adsorption stroke.

5. A process according to claim 1 wherein the evacuation pressure is below about 3 p.s.i.a.

6. A process for recovering substantially pure hydrogen gas from a gas mixture containing hydrogen, nitrogen, ammonia and moisture, comprising the steps of providing said gas mixture at a feed pressure above atmospheric; cooling such compressed gas mixture to a temperature below about 60° F.; providing two beds of crystalline zeolitic molecular sieve material having apparent pore sizes of at least 4 Angstroms; as an adsorption stroke contacting the compressed and cooled gas mixture with a first zeolitic molecular sieve bed thereby adsorbing said nitrogen, ammonia and moisture; discharging substantially pure hydrogen product gas from the first bed; continuing the adsorption stroke for a desired period; performing a regeneration stroke on a second zeolitic molecular bed simultaneously with the first bed adsorption stroke, said regeneration stroke comprising depressurizing such second bed to atmospheric pressure thereby removing gas mixture from the void spaces and simultaneously desorbing a portion of the nitrogen adsorbed during the previous adsorption stroke, evacuating the depressurized second bed to a pressure below atmospheric such that the ratio of evacuation pressure to adsorption pressure is at least 0.2 thereby desorbing ammonia, moisture and additional nitrogen from the bed, diverting a sufficient portion of said hydrogen product gas to the evacuated second bed to repressurize the bed to about said feed gas pressure thereby establishing substantial equilibrium with the residual nitrogen remaining in the evacuated bed; thereafter placing the repressurized second bed on said adsorption stroke and placing said first bed on said regeneration stroke.

7. A process according to claim 6 wherein the crystalline zeolitic molecular sieve material has pore sizes of at least 4.5 Angstroms, the gas mixture feed pressure is between about 50 and 500 p.s.i.a., the compressed gas mixture is cooled to a temperature between about +30° and —100° F. prior to said adsorption stroke, and the evacuation pressure is below about 3 p.s.i.a.

8. A process for recovering substantially pure hydrogen gas from liquid ammonia comprising the steps of providing a liquid ammonia feed stream at a pressure above atmospheric; heating said liquid ammonia to a temperature between about 1650 and 1850° F., thereby dissociating the ammonia into a gas mixture containing hydrogen, nitrogen, ammonia and moisture; cooling the compressed gas mixture to a temperature below about 60° F.; providing a bed of crystalline zeolitic molecular sieve material having apparent pore sizes of at least 4 Angstroms; as an adsorption stroke contacting the compressed and cooled gas mixture with the zeolitic molecular sieve bed thereby adsorbing said nitrogen, ammonia and moisture; discharging substantially pure hydrogen product gas from the molecular sieve bed; continuing the adsorption stroke for a desired period; terminating the gas mixture flow to said molecular sieve bed; depressurizing the nitrogen, ammonia, and moisture-containing bed to atmospheric pressure thereby removing the gas mixture from the void spaces of the bed and simultaneously desorbing a portion of the adsorbed nitrogen; evacuating the depressurized bed to a pressure below atmospheric such that the ratio of evacuation pressure to adsorption pressure is at least 0.2 thereby desorbing ammonia, moisture and additional nitrogen from the bed; diverting a sufficient portion of the hydrogen product gas to the evacuated bed to repressurize the bed to about said feed gas pressure, thereby establishing substantial equilibrium with the residual nitrogen remaining in the evacuated bed; and thereafter consecutively repeating said adsorption stroke and said depressurizing, evacuating and repressurizing steps.

9. A process according to claim 8 wherein the crystalline zeolitic molecular sieve material has pore sizes of at least 4.5 Angstroms, the gas mixture feed pressure is between about 50 and 500 p.s.i.a., the compressed gas mixture is cooled to a temperature between about 30° and —100° F. prior to said adsorption stroke, and the evacuation pressure is below about 3 p.s.i.a.

10. A process for recovering substantially pure hydrogen gas from liquid ammonia comprising the steps of providing a liquid ammonia feed stream at a pressure above atmospheric; heating said ammonia to a temperature between about 1650 and 1850° F. thereby dissociating the ammonia into a gas mixture containing hydrogen, nitrogen, ammonia and moisture; cooling the compressed gas mixture to a temperature below about 60° F.; providing two beds of crystalline zeolitic molecular sieve material having apparent pore sizes of at least 4 Angstroms; as an adsorption stroke contacting the compressed and cooled gas mixture with a first zeolitic molecular sieve bed thereby adsorbing said nitrogen, ammonia and moisture; discharging substantially pure hydrogen product gas from the first bed; continuing the adsorption stroke for a desired period; performing a regeneration stroke on a second zeolitic molecular bed simultaneously with the first bed adsorption stroke, said regeneration stroke comprising depressurizing such second bed to atmospheric pressure thereby removing gas mixture from the void spaces and simultaneously desorbing a portion of the nitrogen adsorbed during the previous adsorption stroke, evacuating the depressurized second bed to a pressure below atmospheric such that the ratio of evacuation pressure to adsorption pressure is at least 0.2 thereby desorbing ammonia, moisture and additional nitrogen from the bed, diverting a sufficient portion of said hydrogen product gas to the evacuated second bed to repressurize the bed to about said feed gas pressure thereby establishing substantial equilibrium with the residual nitrogen remaining in the evacuated bed; thereafter placing the repressurized second bed on said adsorption stroke and placing said first bed on said regeneration stroke.

11. A process according to claim 1 in which zeolite A is the crystalline molecular sieve material.

References Cited in the file of this patent
UNITED STATES PATENTS

| | | |
|---|---|---|
| 2,578,193 | Marshall | Dec. 11, 1951 |
| 2,601,221 | Rosenblatt et al. | June 17, 1952 |
| 2,882,243 | Milton | Apr. 14, 1959 |
| 2,882,244 | Milton | Apr. 14, 1959 |
| 2,901,519 | Patterson et al. | Aug. 25, 1959 |
| 2,944,627 | Skarstrom | July 12, 1960 |
| 3,024,868 | Milton | Mar. 13, 1962 |
| 3,025,145 | Terpenning | Mar. 13, 1962 |